United States Patent
Alecu et al.

(10) Patent No.: US 8,621,839 B2
(45) Date of Patent: Jan. 7, 2014

(54) GAS TURBINE ENGINE BREATHER EXHAUST OIL COLLECTOR

(75) Inventors: Daniel T. Alecu, Toronto (CA); Bryan William Olver, Nobleton (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 1383 days.

(21) Appl. No.: 12/568,006

(22) Filed: Sep. 28, 2009

(65) Prior Publication Data

US 2012/0060508 A1     Mar. 15, 2012

(51) Int. Cl.
*F02C 7/06*     (2006.01)
*F01D 25/18*    (2006.01)

(52) U.S. Cl.
USPC .......... 60/39.08; 60/226.1; 184/6.11

(58) Field of Classification Search
USPC ........... 60/39.08, 226.1, 39.094; 184/6.11; 55/410.1
See application file for complete search history.

(56) References Cited

U.S. PATENT DOCUMENTS

| | | | |
|---|---|---|---|
| 2,493,617 A | 1/1950 | Chubbuck | |
| 2,613,498 A * | 10/1952 | Prendergast | 60/39.08 |
| 2,731,958 A | 1/1956 | Robley | |
| 2,821,174 A | 1/1958 | Scheiterlein | |
| 2,984,226 A | 5/1961 | Court | |
| 3,087,474 A | 4/1963 | Catha | |
| 3,734,639 A * | 5/1973 | Short | 416/96 R |
| 3,877,547 A | 4/1975 | Willuweit et al. | |
| 4,282,016 A * | 8/1981 | Tauber et al. | 55/459.1 |
| 4,343,378 A | 8/1982 | Bremer | |
| 4,459,966 A | 7/1984 | Sakano et al. | |
| 4,579,092 A | 4/1986 | Kandler | |
| 4,627,406 A | 12/1986 | Namiki et al. | |
| 4,886,019 A | 12/1989 | Davis et al. | |
| 5,239,972 A | 8/1993 | Takeyama et al. | |
| 5,277,154 A | 1/1994 | McDowell | |
| 5,285,636 A * | 2/1994 | Mayo et al. | 60/39.094 |
| 5,356,264 A * | 10/1994 | Watson et al. | 415/119 |
| 5,471,966 A | 12/1995 | Feuling | |
| 5,484,258 A * | 1/1996 | Isburgh et al. | 416/97 R |
| 5,937,837 A | 8/1999 | Shaffer et al. | |
| 6,033,462 A | 3/2000 | Dekker et al. | |
| 6,116,015 A * | 9/2000 | Taylor et al. | 60/39.08 |
| 7,377,110 B2 | 5/2008 | Sheridan et al. | |
| 7,566,356 B2 | 7/2009 | Latulipe et al. | |
| 8,038,386 B2 * | 10/2011 | Duchatelle et al. | 415/122.1 |
| 8,235,647 B2 * | 8/2012 | Pisseloup et al. | 60/39.08 |
| 2006/0042223 A1 * | 3/2006 | Walker et al. | 60/39.08 |
| 2010/0187180 A1 | 7/2010 | Baten | |
| 2012/0144841 A1 | 6/2012 | Short et al. | |

FOREIGN PATENT DOCUMENTS

GB     2376269 A  *  11/2002

* cited by examiner

*Primary Examiner* — Ted Kim
(74) *Attorney, Agent, or Firm* — Norton Rose Fulbright Canada LLP

(57) ABSTRACT

A gas turbine engine oil system has an air-oil separator for removing air from an air/oil mixture. A breather tube is connected to an exhaust of the air-oil separator for receiving hot air removed from the air/oil mixture in the air-oil separator. The gas turbine engine oil separator exhaust is directed in a cooled oil collector to cause the oil mist remaining in the air at the exit from the engine air-oil separator to condensate. The oil condensate is returned back into the engine oil system.

15 Claims, 3 Drawing Sheets

GAS TURBINE ENGINE BREATHER EXHAUST OIL COLLECTOR

TECHNICAL FIELD

The application relates generally to gas turbine engines and, more particularly, to turbine oil systems.

BACKGROUND OF THE ART

Gas turbine engine oil systems ingest air in the bearing cavities, and thus a breather (also know as an air-oil separator) is provided to remove air from oil. The breather is vented to allow the air to escape. One problem is that oil mist and vapour remains in the vented air. Venting thus results in some oil loss. The oil loss can stain the engine or nacelle, pollute the environment and require larger oil reserve onboard engine.

Accordingly, there is a need to provide an improved gas turbine engine oil system.

SUMMARY

In one aspect, there is provided a gas turbine engine oil system comprising an air-oil separator for removing air from an air/oil mixture, a breather tube connected to an exhaust of the air-oil separator for receiving hot air removed from the air/oil mixture in the air-oil separator, the hot air still carrying oil aerosol and vapour, an oil collector having an outer surface exposed to a coolant flow and an inner surface defining a cooled chamber, the breather tube extending upwardly into the cooled chamber of the oil collector, the oil collector having an internal volume for collecting oil condensate separated from the hot air discharged in the cooled chamber during engine running, the breather tube having multiple perforations distributed at different axial position along a distal end portion thereof to cause a two-way fluid exchange between the hot air inside the breather tube and cooler air in the cooled chamber outside the breather tube, an exhaust window defined in said oil collector for venting the air from the cooled chamber, and a drain in said oil collector for returning the oil condensate collected during engine running in the internal volume of the oil collector back into an engine gear box at engine shut down when air flow through the breather tube ceases.

In a second aspect, there is provided a gas turbine engine oil system comprising a breather tube connected in fluid flow communication with a gas outlet of an air-oil separator, the breather tube receiving a flow of hot air separated from the oil in the air-oil separator, and an oil collector disposed downstream of the air-oil separator for recuperating at least a portion of the oil remaining in the flow of hot air vented from the air-oil separator, the oil collector comprising a cooled enclosure mounted about a delivery end portion of the breather tube in a coolant flow passage, the coolant flowing over the cooled enclosure causing the oil carried by the hot air flowing through an outlet of the breather tube to condensate in the cooled enclosure, the cooled enclosure having an oil drain and a gas exhaust.

In a third aspect, there is provided a method of recuperating oil from a stream of hot air separated from an air/oil mixture in an air-oil separator of a gas turbine engine oil system, the method comprising: a) directing the stream of hot air from the air-oil separator to a secondary oil collector, b) cooling the hot air in the secondary oil collector to cause oil vapour contained in the hot air to condensate, and c) returning the oil condensate to the gas turbine engine oil system.

DESCRIPTION OF THE DRAWINGS

Reference is now made to the accompanying figures, in which.

DETAILED DESCRIPTION OF THE PREFERRED EMBODIMENTS

Figure 1:
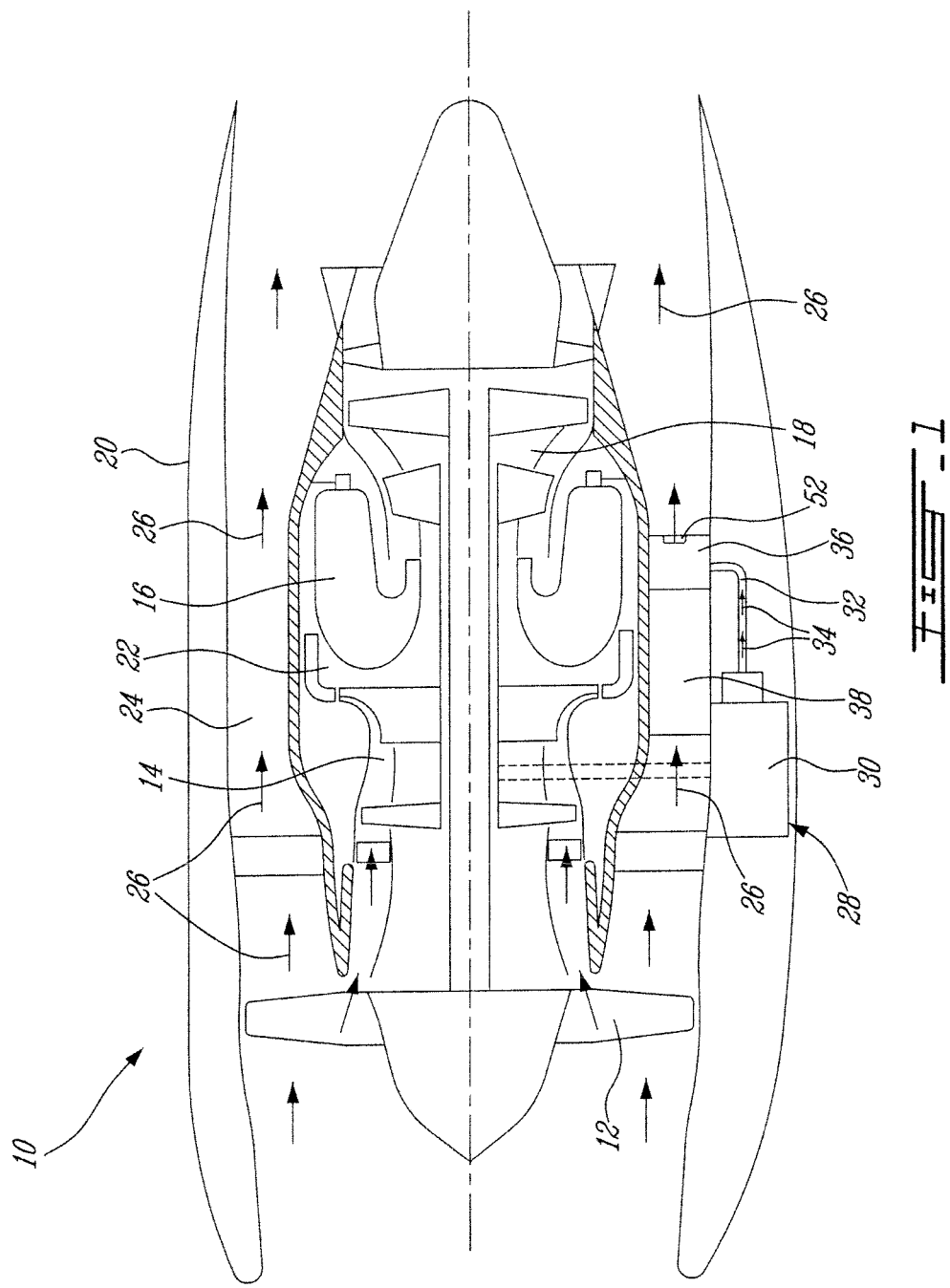
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The gas turbine engine includes a nacelle or outer casing 20 surrounding an inner casing 22 enclosing the core engine. The nacelle 20 is spaced from the inner casing 22 providing an annular bypass passage 24 for flow of air from the fan 12 to the exhaust of the engine, as depicted by arrows 26.

Figure 2:
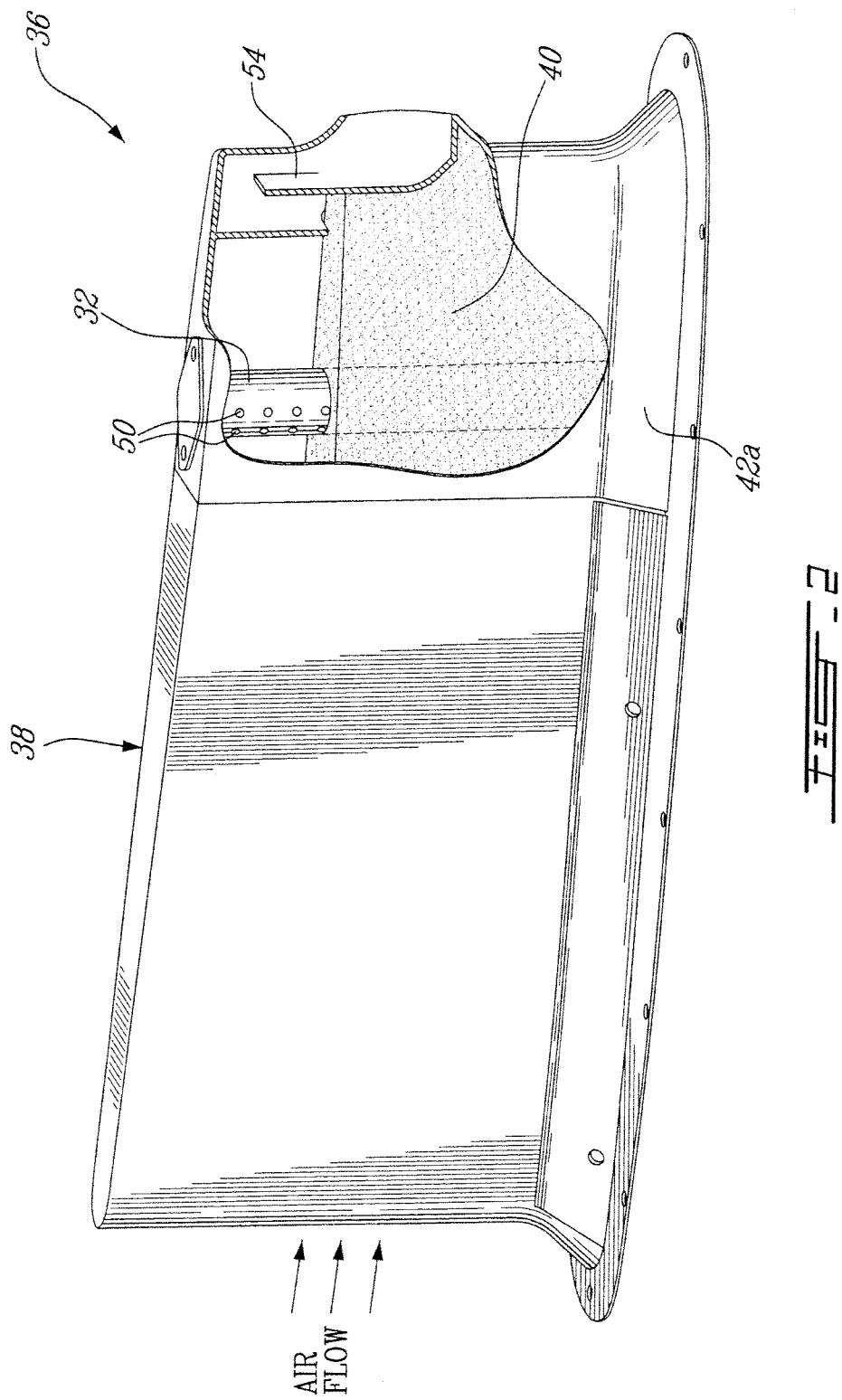
FIG. 2 is an isometric view of a service strut partly broken away to reveal an oil collector integrated into the trailing edge portion of the strut.
Figure 3:
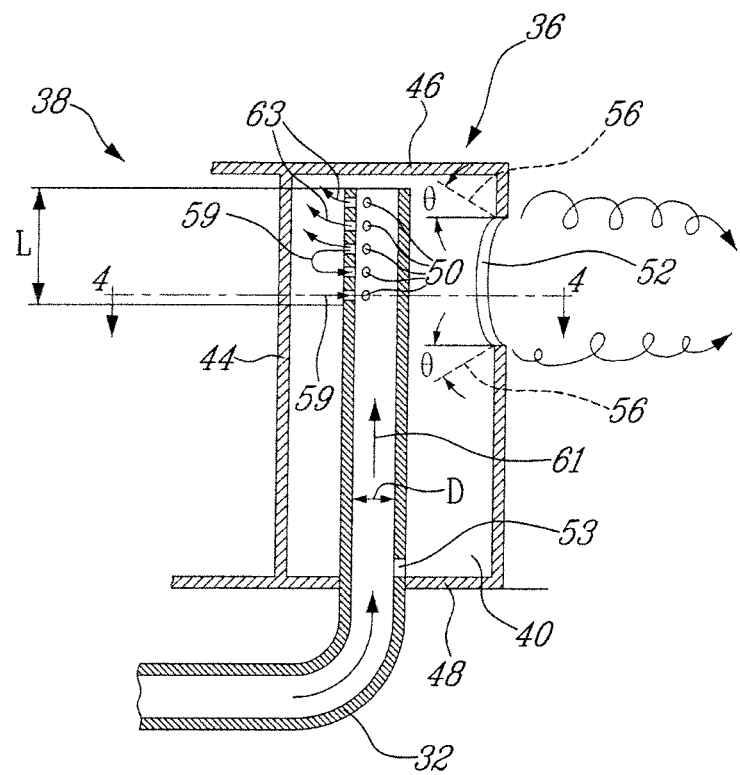
FIG. 3 is an enlarged cross-section view of the oil collector shown in FIG. 2.
Figure 4:
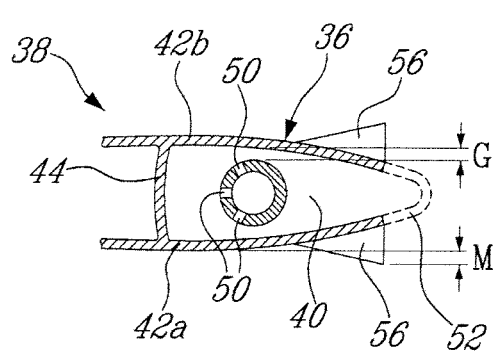
FIG. 4 is a cross-section view taken along line 4-4 in FIG. 3.

An accessory gear box (AGB) 28 driven by the high pressure rotor of the engine 10 provides drive for the engine accessories (not shown). The AGB 28 also provides a sump area for the engine bearing and gear scavenge oil to de-aerate. The AGB breather may comprises an air-oil separator 30 coupled to the gear box 28 to effectively remove the air from the oil before the de-aerated oil be returned back to the engine. For instance, the air-oil separator 30 could be of a centrifugal type. The separator 30 has an exhaust connected to a breather tube 32 for receiving a continuous breather flow containing the hot air removed from the engine oil during engine operation, as depicted by arrows in FIG. 1. This flow of hot air contains oil aerosols and oil vapour. As will be seen hereinafter, the oil aerosols and vapour present in the air-oil separator exhaust flow can be recuperated by cooling the separator exhaust flow in an air cooled oil collector 36 installed on the AGB breather line and returning the oil condensate back to the engine oil system at engine shutdown, thereby minimizing oil losses and preventing the release of oil mist into the environment. The oil collector 36 may be aerodynamically integrated in a trailing edge portion of an existing service strut 38 extending radially through the bypass passage 24 of the engine 10. As shown in FIGS. 2 to 4, the oil collector 36 comprises an oil reservoir or internal chamber 40 bounded by the opposed sidewalls 42a, 42b of the strut 38, a forwardly facing internal partition 44, and top and bottom walls 46,48 respectively corresponding to the radially inner and radially outer flow boundaries of the bypass passage 24. The chamber 40 is cooled by the air flowing through the bypass passage 24 over the airfoil outer surface of the strut 38 (i.e. along sidewalls 43a, 42b). By positioning the oil collector in the bypass passage 24, it is possible to benefit from the large amount of air flow in the bypass passage 24 to maintain the walls 42a, 42*b* of the chamber 40 at a cold temperature relative to the exhaust flow of the oil separator 30.

The breather tube 32 extends from the air-oil separator 30 vertically upwardly into the cooled chamber 40 of the oil collector 36. A plurality of perforations or holes 50 may be defined in the upper end portion of the breather tube 32 to generate a two-way fluid exchange between the inside and the outside of the tube, due to the increasing static pressure along the tube 32 up to the discharge pressure at the top open end of the tube. Such a two-way fluid exchange enhances the separation of condensed oil particles and the heat transfer to the cooled walls 42*a*, 42*b* of the oil collector 36. The holes 50 may be provided in vertically spaced-apart rows defined in a forwardly facing half portion of the vertical section of the tube 32. Various numbers of rows and holes per row can be provided. According to one embodiment, the total surface area of the holes 50 is twice the cross-sectional area ($A_{tube} = \pi D/4$) of the tube passage. Also the top open end of the tube 32 is spaced from the top wall 46 of the chamber 40 by a distance positive but less than ¼ the inner diameter (D) of the tube 32. Still according to a particular embodiment, the cross-sectional area of the tube passage ($A_{tube}$) is approximately equal to the distance (L) between the lowermost row of holes 50 and the top open end of the tube 32 multiplied by the total [i.e. both sides summed up] gap (G) between the tube 32 and the sidewalls 42*a*, 42*b*.

Figure 5:
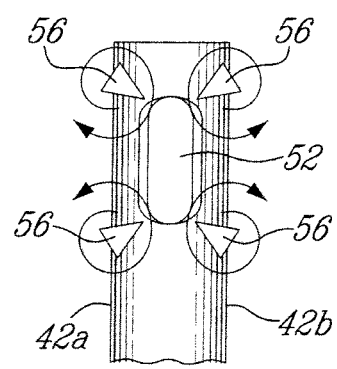
FIG. 5 is a rear end view of the oil collector showing the exhaust window defined in the trailing edge of the service strut.

As best shown in FIGS. 3-5, the oil collector 36 is provided with an exhaust window 52 facing in a downstream direction relative to the flow of air 26 in the bypass passage 24. The exhaust window 52 may be provided in the form of a vertically elongated opening defined in the trailing edge of the service strut 32 (see FIG. 5). The window 52 opens to the bypass passage 24 to discharge the air separated from the oil in chamber 40 into the bypass flow 26. As shown in FIG. 2, baffles or weir plates 54 may be provided inside the chamber 40 to prevent the oil condensate from flowing outwardly of the oil collector 36 through the exhaust window 52. As shown in FIG. 3, a drain 53 is provided for returning the oil condensate collected during engine operation in the chamber 40 back into the AGB 28 at engine shutdown. The drain 53 may be provided in the form of a small hole defined in the lower end of the vertical portion of the breather tube inside the chamber 40. The continuous hot air flow through the breather tube 32 during engine operation prevents the separated liquid oil from being returned continuously into the AGB against the hot air flow exiting the AGB 28. The oil liquid is thus collected in the chamber 40 and returned into the AGB via the breather tube 32 at engine shutdown (i.e. when the breather air flow ceases). However, it is understood that a separate drain could be provided to evacuate the oil collected in the chamber 40 independently of the breather tube 32.

As shown in FIGS. 4 and 5, vortex generators 56 may be provided on the exterior of the strut 38 adjacent the lower and upper corners of the window 52 to provide a quadruple lensing effect on the air flowing over the trailing edge of the strut, thereby providing for a better blending of the air coming from the oil collector 36 into the air bypass stream 26. As highlighted in FIG. 5, the upper vortex pair induces a downdraft onto the air flow discharged from window 52, thus precluding the air flow to attach to the inner bypass duct wall. Likewise, the lower vortex pair induces an updraft precluding the air flow to attach to the outer bypass duct wall. Considering the four vortexes from another perspective, i.e. left pair and right pair, they generate lateral drafts which favour mixing of the air flow with the engine bypass air flow in a direction that does not intersect with a solid wall too soon. The inertia of heavier oil particles, if such particles escape the collector, determines the particle to travel as far as possible from the cores of the four vortexes thus being lensed in a narrow stream following the general engine bypass flow. The vortex generators 56 allow managing the breather exhaust wake to substantially avoid oil streaking in the bypass passage 24. The vortex generators 56 may be provided in the form of triangular wing-like projections. In the exemplary embodiment shown in FIG. 3, the vortex generators 56 are set at an angle $\theta$ of about 10 degrees to the horizontal. As can be appreciated from FIG. 4, the vortex generators 56 project laterally outwardly beyond the maximum strut thickness by a distance (M), wherein M>0.

In operation, the engine fan bypass flow stream 26 cools down the exterior of the oil collector 36. The hot air exiting the engine oil separator 30 carrying oil aerosols and vapour is subject to cooling as the flow progresses through the vertical section of the breather tube 32 in the cooled internal chamber 40 of the collector 36. As depicted by arrows 59 in FIG. 3, cooler air and oil mist is ingested through the first lower rows of holes 50 and mixes with the tube hot main stream 61 due to local static pressure. As depicted by arrows 63, subsequent upper rows of holes 50 release progressively the hot air and oil mix into the air cooled chamber 40. The progressive reduction in the main stream flow rate reduces velocity and increases the static pressure of the main stream 61 until the remaining flow is discharged at the upper open end of the tube 32. The perforations or holes 50 are oriented away from the collector exhaust window 52 in order to force complex flow pattern in the chamber 40. The complex flow pattern in the collector 36 increases the cooling of the collector content by convection over the cold walls of the collector, i.e. the wall of the service strut 38. The cooling induces the condensation of the oil vapour on the existing oil aerosol, which result in larger droplets more likely to precipitate. The oil droplets will collect on the collector inner surface and flow gravitationally to the collector bottom. At engine shutdown, the oil collected during engine running (see FIG. 2) drains by gravity through the drain hole 53 of the vertical section of the breather tube 32 back into the engine oil separator 30. The oil accumulated in the oil separator 30 is centrifuged back into the engine 10 during the following engine start. The blending of the oil collector 36 within the general aerodynamic shape of the service strut 38 minimizes impact on the overall strut drag. The vortex generators 56 control the spreading of the remaining oil aerosol as it exits the collector 36 through the exhaust window 52 and also reduce the service strut drag by reattaching the boundary layer on the strut trailing edge.

The provision of an oil collector on the engine breather line contributes to reduce pollution. It reduces the loss of the oil volatile phase, which reduces the rate at which the oil viscosity increases with the usage. It may also contribute to reduce the engine oil reserve, thus, the engine oil tank weight. It can also reduce the cost of maintenance by reducing the oil consumption and increasing the servicing periods.

The above description is meant to be exemplary only, and one skilled in the art will recognize that changes may be made to the embodiments described without departing from the scope of the invention disclosed. For example, the oil collector could be positioned at other locations in the engine. A vertical section of the tube 32 could be provided with a diffuser. The oil collector could be integrated to other parts of the engine. Additional baffles may be utilized to reduce the flow of accumulated oil to the exhaust window during flight in turbulent atmosphere causing negative vertical acceleration applied to the engine. Still other modifications which fall within the scope of the present invention will be apparent to those skilled in the art, in light of a review of this disclosure, and such modifications are intended to fall within the appended claims.

What is claimed is:

1. A gas turbine engine oil system comprising an air-oil separator for removing air from an air/oil mixture, a breather tube connected to an exhaust of the air-oil separator for receiving hot air removed from the air/oil mixture in the air-oil separator, the hot air still carrying oil aerosol and vapour, an oil collector having an outer surface exposed to a coolant flow and an inner surface defining a cooled chamber, the breather tube extending upwardly into the cooled chamber of the oil collector, the oil collector having an internal volume for collecting oil condensate separated from the hot air discharged in the cooled chamber during engine running, the breather tube having multiple perforations distributed at different axial position along a distal end portion thereof to cause a two-way fluid exchange between the hot air inside the breather tube and cooler air in the cooled chamber outside the breather tube, an exhaust window defined in said oil collector for venting the air from the cooled chamber, and a drain in said oil collector for returning the oil condensate collected during engine running in the internal volume of the oil collector back into an engine gear box at engine shut down when air flow through the breather tube ceases.

2. The gas turbine engine oil system defined in claim 1, wherein the multiple perforations are oriented away from the exhaust window of the oil collector.

3. The gas turbine engine oil system defined in claim 1, wherein the oil collector is integrated in a strut extending through an air bypass passage of a turbofan engine.

4. The gas turbine engine oil system defined in claim 3, wherein the exhaust window opens to the air bypass passage.

5. The gas turbine engine oil system defined in claim 3, wherein said exhaust window is defined in a trailing edge portion of the strut.

6. The gas turbine engine oil system defined in claim 5, wherein the perforations face opposite the oil collector ventilation window.

7. The gas turbine engine oil system defined in claim 5, wherein at least four vortex generators are provided on the exterior of the strut to impart a swirl to the air flowing through the exhaust window.

8. The gas turbine engine oil system defined in claim 1, wherein the breather tube has a top open distal end, said top open distal end being spaced from the inner surface of the oil collector in the cooled chamber.

9. A gas turbine engine oil system comprising a breather tube connected in fluid flow communication with a gas outlet of an air-oil separator, the breather tube receiving a flow of hot air separated from the oil in the air-oil separator, and an oil collector disposed downstream of the air-oil separator for recuperating at least a portion of the oil remaining in the flow of hot air vented from the air-oil separator, the oil collector comprising a cooled enclosure mounted about a delivery end portion of the breather tube in a coolant flow passage, the cooled enclosure having a wall including opposed outer and inner surfaces in heat exchange relationship, the wall, including its inner and outer surfaces, being cooled by a flow of coolant flowing over the outer surface of the wall in the coolant passage, the coolant flowing over the cooled enclosure causing the oil carried by the hot air flowing through an outlet of the breather tube to condense in the cooled enclosure, the cooled enclosure having an oil drain and a gas exhaust; the outlet of the breather tube comprises a plurality of holes distributed at different axial positions along the delivery end portion of the breather tube, the plurality of holes providing a two-way fluid exchange between the hot air inside the breather tube and cooler air in the cooled enclosure outside the breather tube.

10. The gas turbine engine oil system defined in claim 9, wherein at least one baffle is provided inside the cooled enclosure to prevent oil condensate from flowing out of the cooled enclosure through the gas exhaust.

11. The gas turbine engine oil system defined in claim 9, wherein the outlet of the breather tube comprises a plurality of holes vertically distributed along an upper end portion of the breather tube.

12. The gas turbine engine oil system defined in claim 9, wherein the cooled enclosure is integrated in a service strut extending through a gas turbine engine bypass passage.

13. The gas turbine engine oil system defined in claim 12, wherein the gas exhaust comprises a window defined in a trailing edge of the service strut, the window opening to the gas turbine bypass passage.

14. The gas turbine engine oil system defined in claim 13, wherein a plurality of vertically spaced-apart holes are defined in the breather tube, all said plurality of vertically spaced-apart holes facing away from said window.

15. The gas turbine engine oil system defined in claim 13, wherein fluid flow deflectors are provided on the service strut adjacent said window, one flow deflector being provided at each corner of the window.

* * * * *